United States Patent [19]

Kubo et al.

[11] 4,399,895
[45] Aug. 23, 1983

[54] TORQUE CONVERTER LOCK UP CLUTCH ROTARY DAMPER WITH REINFORCING LIPS

[75] Inventors: Seitok Kubo, Toyota; Koujiro Kuramochi, Okazaki; Tatsuo Kyushima, Toyota, all of Japan

[73] Assignee: Toyota Jidosha Kogyo Kabushiki Kaisha, Japan

[21] Appl. No.: 210,211

[22] Filed: Nov. 25, 1980

[30] Foreign Application Priority Data

Mar. 21, 1980 [JP] Japan ................................. 55-37858

[51] Int. Cl.³ .............................................. F16D 3/66
[52] U.S. Cl. ................................. 192/3.29; 192/106.2
[58] Field of Search ................. 192/106.2, 106.1, 3.28, 192/3.29, 3.3, 3.31, 3.32, 3.33, 70.17; 464/68, 67

[56] References Cited

U.S. PATENT DOCUMENTS

| 3,497,043 | 2/1970 | Leonard | 192/3.3 X |
| 4,269,296 | 5/1981 | Flotow et al. | 192/106.2 |
| 4,274,519 | 6/1981 | Moroto et al. | 192/3.28 |

Primary Examiner—George H. Krizmanich
Attorney, Agent, or Firm—Stevens, Davis, Miller & Mosher

[57] ABSTRACT

A rotary power transmission device includes a torque converter, which transmits rotary power between coaxial power input and power output shafts, and a lock up clutch between the power input and power output shafts, which includes first and second plate elements which can be biased towards or away from one another. The first clutch plate element is connected to the power input shaft. In a generally annular space defined between the outer part of the generally toroidal torque converter and the outer part of the second clutch plate element there is disposed a rotary damper which rotationally couples together the second clutch plate element and the power output shaft and provides a certain amount of rotary damping therebetween. The rotary damper includes two outer damper plate elements sandwiched on either side of one inner damper plate element, the outer damper plate elements being connected together, and the combination of them being rotationally connected to the second clutch plate element, while the inner damper plate element is rotationally connected to the power output shaft. Two of the damper plate elements are flat annuli lying in said annular space, and one is subtantially a flat disk whose central portion is connected to the power output shaft. The inner damper plate element is pierced with several circumferentially extending slots in which are received compression coil springs, and opposing these slots there are formed in the outer damper plate elements corresponding circumferentially extending slot shaped apertures into which the sides of these springs project. Around the entire peripheries of the slot shaped apertures in the outer damper plate elements there extend raised lips, which project from the planes of the outer damper plate elements in the direction away from the inner damper plate element. These lips reinforce the outer damper plate elements, and optionally may taper outwards so as snugly to receive the sides of the compression coil springs.

4 Claims, 4 Drawing Figures

TORQUE CONVERTER LOCK UP CLUTCH ROTARY DAMPER WITH REINFORCING LIPS

BACKGROUND OF THE INVENTION

The present invention relates to the field of torque converters, and more particularly relates to the field of torque converters equipped with lock up clutches which incorporate rotary dampers.

It is well known for a fluid torque converter, which comprises a pump impeller coupled to a power input shaft, a turbine connected to a power output shaft, and a stator, and in which by fluid circulation through the pump impeller, the turbine, and the stator rotary power is transmitted between said pump impeller and said turbine, so that this rotary power is transmitted from said power input shaft to said power output shaft, to be provided with a lock up clutch. Such a lock up clutch is arranged so as directly mechanically to connect the power input shaft to the power output shaft, selectively, and the selective engagement of this direct engagement clutch is performed according to the operational conditions of the vehicle to which this torque converter is fitted. In general, such a lock up clutch is engaged when the torque converter is required to transmit rotary power at high rotational speed, at which time the torque conversion function of the torque converter is not substantially required. In such a case, if the lock up clutch is not engaged, then, although the torque converter provides a substantially direct power transmission function between its pump impeller and its turbine, a small amount, such as a few percent, of slippage between the pump impeller and the turbine will inevitably occur, and this wastes a substantial amount of energy through the useless circulation of hydraulic fluid, and also causes undesirable heating up of the hydraulic fluid within the torque converter.

When such a lock up clutch is provided for a fluid torque converter, the problem arises that, when the lock up clutch is engaged from the disengaged condition, a substantial torque shock inevitably occurs, because before the lock up clutch is engaged, as explained above, there is inevitably a certain amount of slippage between the power input shaft and the power output shaft, and they are thus not rotating at exactly the same rotational speed at this time, due to the action of the torque converter. Further, during operation of the vehicle incorporating the torque converter while the lock up clutch is engaged, it often occurs that torque shock is transmitted along the power train. Therefore, it is usual to provide a rotary damper within the power train as part of the lock up clutch, so that such a torque shock can be effectively absorbed.

Such a rotary damper in general conventionally comprises two outer disk elements which are sandwiched on opposite sides of an inner disk element, the two outer disk elements being coupled together with respect to their rotation; and one of the power input shaft and the power output shaft is arranged to be rotationally coupled to said outer disk elements, while the other of them is arranged to be coupled to said inner disk element. The inner disk element is conventionally rotationally coupled to the outer disk elements with a certain amount of damped rotational free play, or cushioning, therebetween, in a way which will now be described.

In the inner disk element there are formed slot shaped apertures extending generally in the circumferential direction of said inner disk element, and within these slot apertures there are disposed compression coil springs whose axes lie generally in the plane of the inner disk element and in its circumferential direction. Corresponding to each of these springs, in the outer disk elements in positions opposing the springs, there are formed circumferentially extending slot shaped apertures, which typically are formed by making incisions shaped in the form of a capital letter "I" with serifs, the long portion of the "I" lying generally in the circumferential direction of the outer disk element. That is to say, each of these incisions is formed as one longer circumferentially extending incision, and two shorter radially extending end bar incisions, one at each of the ends of said longer incision. The thus formed flap portions are then bent outwards, in the direction of the side of the outer disk element of which they formed part which faces away from the inner disk element, at angles of approximately 45°, so that they may receive the sides of the aforesaid compression coil springs which rest within the slot shaped apertures formed in the inner disk element. Thus, the sides of these compression coil springs are received in so called troughs formed in the outer disk elements.

Thus, when the inner disk element is rotated relative to the combination of the outer disk elements, the one ends of these compression coil springs in the one direction of rotation abut against the ends of the circumferentially extending slot shaped apertures in the inner damper plate element, and the other ends of these compression coil springs abut against the other ends in the other circumferential direction of the slot shaped apertures thus formed in the outer damper plate elements, and accordingly by the compression of the compression coil springs torque shock is absorbed.

This construction minimizes the transmission of rotational torque shock between the power input shaft and the power output shaft; that is to say, in a vehicle incorporating the aforesaid torque converter, between the engine and the driven wheels thereof, when the lock up clutch is engaged from the disengaged condition. Such a conventional construction for a rotary damper for a lock up clutch for torque converter is satisfactory; but the cutting of these "I" shaped cutouts in the outer disk elements significantly weakens these outer disk elements. This is not very important when the radius of the rotary damper is small, because in this case the centrifugal force acting upon the portions thereof such as the compression coil springs is relatively small, even when the torque converter and the lock up clutch thereof are rotating at high rotational speed. However, when it is attempted to increase the radius of the rotary damper, problems are found with regard to the durability thereof, and with regard to centrifugal forces.

SUMMARY OF THE INVENTION

In more detail, in an effort to minimize the axial length of such a torque converter with a lock up clutch and a rotary damper, which is very important with regard to minimizing the total axial length of an engine and transmission incorporating this torque converter, which has become a very inportant design characteristic with regard to the provision of engines and transmissions for front engine front wheel drive automobiles, i.e., for so called FF type automobiles which are becoming more and more popular nowadays, it was observed that a roughly annular space was left between the outer part of the turbine of the torque converter, which typically had a curved axial cross sectional shape, and the outer part of a clutch disk element of the lock up clutch of the torque converter, which typically had a substantially flat disk shape, and it was realized that it would be advantageous for the rotary damper of the lock up clutch of the torque converter to be located within the aforesaid annular space, which ought to be advantageously utilized, in order to minimize the axial length of the torque converter and the lock up clutch as a whole.

With regard to this, in adapting the above explained construction for the rotary damper, it is necessary to substantially increase the radius thereof, so that said radius becomes substantially equal to the outer radius of the fluid torque converter. In this case, the centrifugal forces acting upon the elements of the rotary damper such as the compression coil springs thereof become much greater, because they are proportional to the radial distance away from the axis of the fluid torque converter at which these compression coil springs are located. Accordingly, this much higher centrifugal force has proved a problem, because it has distorted the outer disk elements of the rotary damper, over a period of time. When this has happened, the compression coil springs have not remained properly in place, with their axes substantially lying in the plane of the inner disk element, and warping of the entire structure has sometimes occurred, which can cause premature failure of the rotary damper.

Therefore, it is an object of the present invention to tackle these problems which are present with a prior art rotary power transmission device including a torque converter and a lock up clutch with a rotary damper, and to provide an improved rotary damper construction for use with such a rotary power transmission device, which may be constructed of a large enough radius to be introduced within the annular space defined, as above explained, between the outer part of the torque converter and a flat disk element of the lock up clutch, in order to minimize the axial length of the rotary power transmission device.

It is a further object of the present invention to provide a rotary power transmission device incorporating a torque converter and a lock up clutch with a rotary damper, in which the rotary damper is durable over a long period of use, and is not distorted by centrifugal forces produced when the rotary power transmission device rotates for a considerable time at a high rotational speed.

It is a further object of the present invention to provide a rotary power transmission device incorporating a torque converter and a lock up clutch with such a rotary damper, in which the compression coil springs incorporated in the rotary damper are securely and positively held in their places, without any likelihood that they may become improperly positioned.

It is a yet further object of the present invention to provide such a rotary power transmission device in which the plate elements of the rotary damper are formed by a simple pressing process, cheaply and effectively, without their strength being unduly low.

It is a yet further object of the present invention to provide such a rotary power transmission device in which one of the outer plate elements of the rotary damper is formed as a flat annulus, and only one of these outer plate elements is formed in a disk shape which is rotationally coupled to the power output shaft, without the strength of the combination of these outer plate elements being thereby so deteriorated that undue flexing and bending thereof contributes to premature failure of the rotary damper.

According to the present invention, these and other objects are accomplished by a rotary power transmission device, comprising: (a) coaxial power input and power output shafts; (b) a torque converter, comprising a pump impeller rotationally connected to said power input shaft, a turbine rotationally connected to said power output shaft, and a stator; circulation of fluid through said pump impeller, said turbine, and said stator transmitting rotary power from said power input shaft to said power output shaft; (c) a substantially disk shaped clutch assembly coaxial with said torque converter, said clutch assembly comprising a first clutch plate element rotationally coupled to said power input shaft, and a second clutch plate element opposing said first clutch plate element; (d) a rotary damper mounted so as rotationally to couple said second clutch plate element and said power output shaft with a certain amount of damped rotational play therebetween, comprising: (d1) two outer mutually opposed damper plate elements and one inner damper plate element sandwiched between said outer damper plate elements, two of said damper plate elements being substantially flat annuli and the other said damper plate element being substantially a flat disk; said outer damper plate elements being rotationally coupled together; said inner damper plate element being formed with a plurality of circumferentially extending slot shaped apertures, and said outer damper plate elements being each formed with a plurality of generally circumferentially extending slot shaped apertures opposing said circularly extending slot shaped apertures in said inner damper plate element; and each of said slot shaped apertures in said outer damper plate elements being formed with a raised lip projecting from the general plane of its outer damper plate element in the direction away from said inner damper plate element, said raised lip being continuous all around the entire periphery of said slot shaped aperture; and (d2) a plurality of compression coil springs, each lying within one of said slot shaped apertures in said inner damper plate element and extending generally therealong circumferentially to said inner damper plate element, with its sides projecting into those said slot shaped apertures in said outer damper plate elements which oppose said slot shaped aperture in said inner damper plate element; (e) and a means for selectively biasing said first and second clutch plate elements towards and away from one another, so as to be engaged to and disengaged from one another; (f) whereby, when said outer damper plate elements rotate relative to said inner damper plate element, the ends of said compression coil springs in one rotational direction abut against the ends in that rotational direction of said circumferentially extending slot shaped apertures in said inner damper plate element, and the ends in the rotational direction opposed to said one rotational direction of said compression coil springs abut against the ends in said other rotational direction of the said circumferentially extending slot shaped apertures in said outer damper plate elements, said ends in said other rotational direction of said slot shaped apertures in said outer damper plate elements being reinforced by the portions of said raised lips which extend along said ends of said apertures, and the stiffness of the peripheries of said apertures in said outer damper plate elements being promoted by the provision of said raised lips, so that said compression coil springs are well able to withstand high centrifugal forces tending to urge them away from the rotational axis of said rotary damper, when said rotary power transmission device is transmitting power at high rotational speed.

According to such a construction, because said raisd lips extend all around the entire peripheries of said slot shaped apertures in said outer damper plate elements, they substantially reinforce said outer damper plate elements, especially when such an outer damper plate element is formed as a flat annulus. The extra strength given to the outer damper plate elements by these raised lips extending all around the peripheries of the slot shaped apertures therein is much greater than the strength given in the prior art by the aforesaid flaps which are bent to an angle of approximately 45° to the plane of the outer damper plate elements, because these flaps have only extended in the circumferential direction of the damper plate elements, in the prior art, and the shorter sides of the slot shaped apertures in the damper plate elements have not been, in the prior art, reinforced with any flange portions. On the other hand, according to the present invention, these continuous raised lips extending all the way around the slot shaped apertures reinforce the damper plate elements both in the radial and in the circumferential direction against bending, flexing, and the like, and accordingly greatly promote the durability of the damper plate elements, even when these damper plate elements are of a relatively large radius, such as is required in the abovementioned construction.

Further, according to a particular constructional specialization of the present invention, each of said raised lips may extend from the plane of the outer damper element of which it forms a part generally at an acute angle and tapering outwards and towards the inside of said circumferentially extending slot shaped aperture along whose circumferential periphery it passes; and according to a yet more specialized aspect of the present invention, said acute angle may be approximately 45°. This will ensure that these raised lips positively, securely, and snugly maintain in place the compression coil springs, by the sides of the compression coil springs nestling against the inner sides of the raised lips.

Further, according to another specialized aspect of the present invention, the raised lips may be formed, by pressing, from the material which lies generally inside said circumferentially extending disk shaped apertures, simultaneously with the pressing formation of said outer damper plate elements. This provides a cheap, accurate, and effective way of simply forming said raised lips.

BRIEF DESCRIPTION OF THE DRAWINGS

The present invention will become more fully understood from the following description of a preferred embodiment thereof, which is to be taken in conjunction with the accompanying drawings. It should be clearly understood, however, that the description of the embodiment, and the drawings, are all of them provided purely for the purpose of illustration and exemplification only, and are in no way to be taken as limitative of the scope of the present invention. In the drawings.

DESCRIPTION OF THE PREFERRED EMBODIMENT

Figure 1:
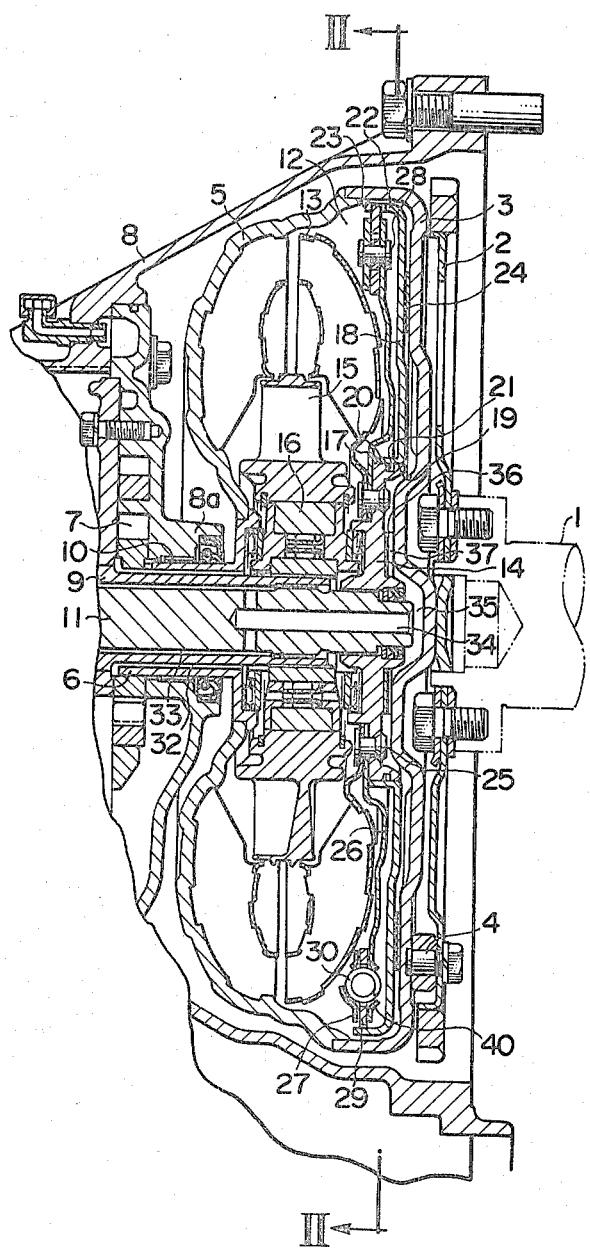
FIG. 1 is a vertical axial sectional view through a preferred embodiment of the rotary power transmission device incorporating a torque converter with a lock up clutch and a rotary damper according to the present invention.

Referring to FIG. 1, the reference numeral 1 denotes a power input shaft, which is only shown in phantom form in the drawing, and which is connected to the rotary power output member such as crankshaft of an engine not shown in the drawing. The power input shaft 1 is rotated in the clockwise direction as viewed from the right of FIG. 1. To the end of the power input shaft 1 there is connected a flywheel 2 by a plurality of bolts. By a further plurality of bolts 4 there is connected to this flywheel 2 a torque converter housing front cover 3, which is shaped as a generally disk shaped member with an outer peripheral axially extending flange, facing to the left in FIG. 1. Against the left hand edge in FIG. 1 of this outer peripheral flange there is abutted the right hand edge of the casing portion of a pump impeller 5. The pump impeller 5 comprises this casing portion and a plurality of vanes located at the inside of the casing portion. The pump impeller 5 is supported on a hollow shaft 6 which is coaxial with the power input shaft 1, and which is rotatably supported, via a supporting element 10 which may be a needle roller bearing assembly, by the hub portion 8a of the fixed torque converter housing 8. The left hand end of the hollow shaft 6 in FIG. 1 drives the inner rotor of a hydraulic fluid pump 7. Through the central portion of the hollow shaft 6 there passes a sleeve member 9, the left hand flanged end of which is fixed to the hub portion 8a of the torque converter housing 8, and which extends rightwards in the figure to an intermediate portion within the torque converter, where there is mounted on it, via a one way clutch 16, a torque converter stator member 15 provided with a plurality of vanes.

Through the central portion of the sleeve 9 there passes a power output shaft 11, and this power output shaft 11 protrudes out from the right hand end of the sleeve 9 in FIG. 1. On this right hand end of the power output shaft 11 there is mounted a hub 14 as rotationally connected thereto, and to the outer portion of this hub 14 there is attached by a plurality of studs a torque converter turbine 13, which is provided with a plurality of vanes.

In a per se well known way, the pump impeller 5, the turbine 13, and the stator 15 provide transmission of rotary power by fluid circulation around paths defined by their vanes. The torque converter comprising the pump impeller 5, the turbine 13, and the stator 15 is generally toroidal in shape, and the part remote from its axis of its axial cross sectional shape is curved; in other words, the outer sectional shape of the turbine 13 is a smooth curve.

As is per se well known in torque converters of this type, when the torque converter is transmitting rotational power at a high rotational speed, the torque conversion function thereof becomes substantially inconsiderable, and the pump impeller 5, the turbine 13, and the stator 15 rotate substantially together, along with a mass of hydraulic fluid, as one unit. However, even at such a high rotational speed, a certain few percent of slippage is still liable to occur between the driving pump impeller 5 and the driven turbine 13, and, while this slippage has no practical effect on the operation of the vehicle to which the torque converter is fitted, it is wasteful of energy and causes undesirable heating of the hydraulic fluid within the torque converter. Accordingly, a lock up clutch assembly is provided for mechanically rotationally coupling together the pump impeller 5 and the turbine 13, and for thus eliminating said hydraulic slippage. This lock up clutch assembly will now be described.

The outer peripheral portion of the hub member 14 is formed as a cylindrical surface 17 which is smooth, and this cylindrical surface 17 is slidably engaged with the cylinder shaped inner peripheral surface 19 of the hub portion of a generally disk shaped clutch element 18, which axially opposes the inner surface of the front cover 3 of the torque converter housing. Around the outer circumferential surface 17 of the hub member 14 there is formed an annular groove 20, and within this annular groove 20 there is fitted an annular sealing ring 21, which accordingly provides a fluid seal between the cylindrical outer peripheral surface 17 of the hub member 14 and the cylindrical inner peripheral surface 19 of the clutch plate element 18.

Around the outer periphery of the clutch plate element 18 there is formed a cylindrical axially extending flange, the outer peripheral surface 22 of which is smooth and opposes the inner peripheral surface 23 of the leftwardly projecting (in the drawing) flange of the front cover 3 of the torque converter housing. No sealing member is provided for positively ensuring a fluid seal between these two members, but the proximity of the outer cylindrical surface 22 formed on the flange of clutch plate member 18 and the inner cylindrical surface 23 formed in the flange of the front cover 3 ensures a very restricted gap therebetween, resistance of which to flow of hydraulic fluid is substantial. On the left hand side in the drawing of the front cover 3 there is provided an annular clutch lining 24, opposing the clutch plate element 18. Accordingly, when the hydraulic fluid pressure on the left hand side of the clutch plate element 18 is substantially greater than that on the right hand side of the clutch plate element 18, the clutch plate element 18 is biased to the right in the drawing so as to be tightly brought into contact with the annular clutch facing 24 provided on the left hand side in the drawing of the front cover 3, and thus the clutch plate element 18 is rotationally coupled to the front cover 3, while, on the other hand, when the hydraulic fluid pressure on the right hand side of the clutch plate element 18 is substantially greater than the hydraulic fluid pressure on the left hand side of the clutch plate element 18, then the clutch plate element 18 is biased to the left in the drawing, away from the front cover 3, and accordingly these elements are rotationally uncoupled from one another.

As will be explained hereinafter, the clutch plate element 18 is rotationally coupled at its outer flange portion, via a rotary damper assembly, to the hub member 14 which is rotationally coupled to the power output shaft 11. Accordingly, when the clutch plate element 18 is biased by the aforesaid excess of the pressure on its left side over the pressure on its right side towards the front cover 3 so as to be rotationally coupled thereto, the power input shaft 1 is directly rotationally coupled, via the front cover 3, the clutch plate element 11, and the hub member 14, to the power output shaft 11. In this condition, the torque converter assembly comprising the pump impeller 5, the turbine 13, and the stator 15 has no significant function of transmission of rotational power, and rotates as a unit along with the hydraulic fluid therein, according to the engagment of the above described direct engagement clutch assembly. In this state, substantially no energy is lost by swirling of the hydraulic fluid within the torque converter assembly. Accordingly, the provision of this direct engagement clutch assembly incorporating the clutch plate element 18 and the front cover 3 effects a very valuable saving of energy, and reduction of heat generation, over the unaided operation of the torque converter assembly.

The arrangements for biasing the clutch plate element 18 leftwards and rightwards in the drawing will now be described.

Two fluid channels are provided for the introduction of hydraulic fluid to within the casing assembly comprising the front cover 3 and the outer casing portion of the pump impeller 5: a first hydraulic fluid channel defined between the fixed sleeve member 9 and the hollow shaft 6 which supports the pump impeller 5, through a tubular gap denoted by the reference numeral 32 in the drawing, hydraulic fluid passing through this gap 32 being discharged within the torque converter assembly at points around the base of the stator 15; and a second hydraulic fluid channel defined between the power output shaft 11 and the fixed sleeve member 9, through a tubular gap denoted by the reference numeral 33 in the drawing, hydraulic fluid passing through this gap 33 being passed through a radial hole in the power output shaft 11 into a central axial hole 34 bored in its right hand portion in the drawing, and then being introduced through a space 35 and grooves 37 of a washer 36 into the space between the clutch plate element 18 and the front cover 3, on the right hand side of the clutch plate element 18. Selectively, according to operational conditions of the vehicle and of the engine incorporated therein, under the control of a fluid pressure control system which is not shown in the drawing and which will not be further described herein, hydraulic fluid under pressure from the hydraulic fluid pressure pump 7 is pumped into one of these first and second hydraulic fluid channels.

When hydraulic fluid is pumped into the second hydraulic fluid channel 33, so that it is supplied into the space between the clutch plate element 18 and the front cover 3, on the right hand side of the clutch plate element 18 in the drawing, and is discharged from the first hydraulic fluid channel 32, then this continuous fluid flow, because as mentioned above the annular gap between the circumferential outer surface 22 of the clutch plate element 18 and the circumferential inner surface 23 of the leftwardly in the drawing projecting flange of the front cover 3 is restricted and presents a substantial resistance to the flow of hydraulic fluid, causes the clutch plate element 18 to be biased in the leftwards direction in the drawing, out of contact with the annular clutch lining 24 mounted on the left hand side in the drawing of the front cover 3, and accordingly in this condition the lock up clutch does not function to couple together the power input shaft 1 and the power output shaft 11, and accordingly the torque converter comprising the pump impeller 5, the turbine 13, and the stator 15 performs its power transmitting function, via the circulation of hydraulic fluid therein.

On the other hand, if the flow of hydraulic fluid through the torque converter produced by the hydraulic fluid pressure pump 11 is reversed by the aforementioned fluid pressure control system from the abovementioned condition, i.e., if hydraulic fluid is pumped into the first hydraulic fluid channel 32 so as to be supplied into the interior of the torque converter, the clutch plate element 18 is biased to the right in the drawing, so as securely to engage it against the annular clutch lining 24 provided on the left hand side of the front cover 3. In this condition, the lock up clutch assembly provides its function of directly coupling the power input shaft 1 to the power output shaft 11, and the torque converter assembly comprising the pump impeller 3, the turbine 13, and the stator 15 is relieved of any function of transmitting rotational power between the power input shaft 1 and the power output shaft 11.

When the lock up clutch assembly described above is being switched from its non connected state to its connected state, there is a risk that a sudden torque shock will occur, because even when the vehicle incorporating this torque converter is being operated at high speed there is always a certain difference of rotational speed between the power input shaft 1 and the power output shaft 11, due to the aforesaid residual few percent of slippage between the pump impeller 5 of the torque converter and the turbine 13 thereof. Further, during the state of engagement of the lock up clutch assembly, it is desirable to cushion the effect of torque shocks which are being transmitted along the power train. Therefore, as mentioned above, a rotary damper assembly which will now be described is provided in the power train of the lock up clutch. This serves both to cushion the shock of the engagement of the lock up clutch, and also to cushion rotational shocks being transmitted along the power train while the lock up clutch is engaged. As outlined before, with the object of minimizing the axial length of the torque converter incorporating the lock up clutch, this rotary damper assembly is arranged to be provided in an annular space defined between the outer part of the torque converter assembly, i.e., of the turbine member 13 thereof, which, as explained above, is of curved axial cross sectional shape, and the outer part of the clutch plate element 18, which as explained above, is of substantially a disk shape. The advantageous use of this space for the mounting of the rotary damper assembly results in a very useful shortening of the total axial length of the construction; but this arrangement, as outlined above, requires that the rotary damper assembly be of a large radius, substantially equal to the outer radius of the clutch plate element 18, and accordingly the centrifugal forces acting thereon are substantial, when the vehicle is being operated at high torque converter rotational speed. The measures taken to overcome the damaging effect of the high centrifugal forces will be seen hereinafter.

The rotary damper assembly comprises two outer damper plate elements 26 and 27 which are axially mutually opposed, and one inner damper plate element 29 which is sandwiched between said outer damper plate elements 26 and 27. The outer damper plate elements 26 and 27 are rotationally coupled together by a plurality of pins 28, only one of which can be seen in the figure, which pass through circular holes in the outer damper plate elements 26 and 27, and through circumferentially extending slot shaped apertures in the inner damper plate element 29, which are formed as slots in order not to hamper the limited rotational movement of the inner damper plate element 29 with respect to the outer damper plate elements 26 and 27. The outer damper plate element 27, in this embodiment, and the inner damper plate element 29 are formed as substantially flat annuli, and lie generally in the aforesaid annular space defined between the outer part of the turbine 13 of the torque converter and the outer portion of the substantially flat clutch plate element 18. The other outer damper plate element 26 is formed substantially as a flat disk with a central hole therethrough, and the inner peripheral portion of this flat disk damper plate element 26 is connected by a plurality of pins 25 to the hub member 14 which is rotationally coupled to the power output shaft 11, as described above. Further, the outer peripheral portion of the annular inner damper plate element 29 is rotationally coupled to the edge portion of the outer circumferential leftwardly axially extending flange portion of the clutch plate element 18. The outer damper plate elements 26 and 27 are rotationally coupled, as will be seen hereinafter, with a certain amount of damped rotational play available therebetween, with the inner damper plate element 29, and thereby, as stated above, the clutch plate element 18 is connected with a certain amount of damped rotational play therebetween with the hub member 14 which is rotationally coupled to the power output shaft 11, via the aforesaid damper assembly.

In a different embodiment of the present invention, the configuration of this damper plate assembly could be somewhat different. It would be possible for the rotational coupling of the outer damper plate element 26 to the hub member 14, and the rotational coupling of the inner damper plate element 29 to the clutch plate member 18, to be reversed. In such a configuration, the inner damper plate element 29 would be formed as a disk element, the inner part of which was rotationally coupled to the hub member 14, and both of the outer damper plate elements 26 and 27 would be formed as substantially flat annuli, the outer part of at least one of them being rotationally coupled to the outer peripheral portion of the clutch plate member 18. Such a reversed construction would still be within the scope of the present invention; the rotary damper assembly would still generally lie within the aforesaid annular space defined between the outer part of the torque converter turbine 13 and the substantially flat clutch plate member 18, and the torque transmitting and cushioning function of the rotary damper assembly would remain the same as in the shown preferred embodiment.

Figure 2:
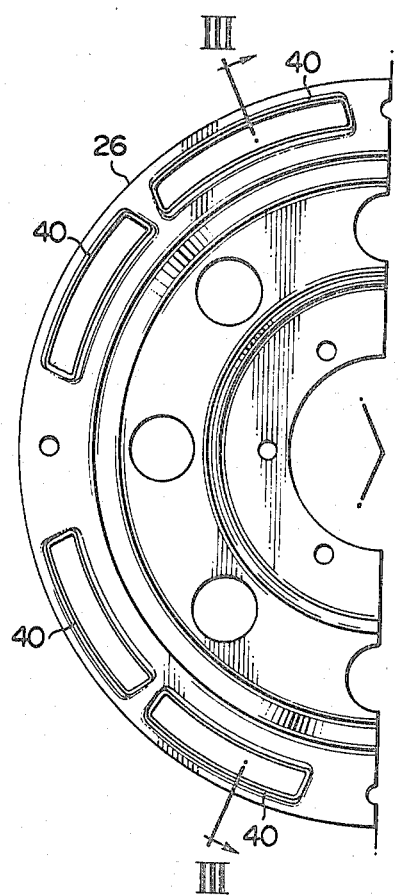
FIG. 2 is a part plan view of a disk shaped outer damper plate element of the rotary damper of the preferred embodiment of the rotary power transmission device according to the present invention shown in FIG. 1, taken along the line II—II in FIG. 1, and particularly showing raised lip portions surrounding the circumferential slot shaped apertures in this damper plate element.
Figure 3:
FIG. 3 is a sectional view through the damper plate element shown in FIG. 2, taken along the line III—III in FIG. 2.
Figure 4:
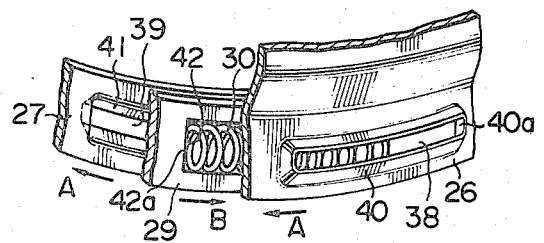
FIG. 4 is an exploded perspective view of a peripheral part of the two outer damper plate elements and of the inner damper plate element of the rotary damper of the preferred embodiment of the rotary power transmission device according to the present invention shown in FIG. 1, showing a compression coil spring fitted in a slot aperture in the inner damper plate element, and particularly showing the lip portions formed around the slot shaped apertures formed in the outer damper plate elements.

The arrangements for damped rotational coupling between the outer damper plate elements 26 and 27 and the inner damper plate element 29 will now be described. In this connection, FIG. 2 is a plan view of part of the disk shaped outer damper plate element 26, taken along the lines II—II in FIG. 1, and FIG. 3 is an axial cross section therethrough, taken along the line III—III in FIG. 2. Further, FIG. 4 is a partly cut away exploded perspective view of part of the engaging construction between the outer damper plate elements 26 and 27 and the inner damper plate element 29.

The inner damper plate element 29 is formed with a number of generally circumferentially extending slot shaped apertures 42, which have square cut ends. Opposing each of these slot shaped apertures 42 in the inner damper plate element 29 there are formed in each of the outer damper plate elements 26 and 27 a plurality of generally circumferentially extending slot shaped apertures 38 and 39, respectively. Around the entire periphery of each of the circumferentially extending slot shaped apertures 38 there is formed a raised lip 40, which projects out from the general plane of said outer damper plate element 26 away from the inner damper plate element 42, as best seen in FIG. 4. Correspondingly, around the entire periphery of each of the circumferentially extending slot shaped apertures 39 in the second damper plate element 27 there is formed a raised lip 41, which projects out from the general plane of said outer damper plate element 27 in the direction away from said inner damper plate element 29. Particularly according to the present invention, each of these raised lips 40 or 41 extends all around the periphery of its circumferentially extending slot shaped opening 38 or 39 in its damper plate element 26 or 27, including extending around the end portions of said circumferentially extending slot shaped opening 38 or 39. The reference numeral 40a in FIG. 4 denotes one such portion of the lip member 40 which extends along an end portion of one of the slot shaped openings 38 in the damper plate element 26.

According to a particular specialized aspect of the present invention, in the shown embodiment the raised lips 40 and 41 form acute angles with the planes of their respective damper plate elements 26 and 27, and in the particular shown preferred embodiment these angles are approximately 45°. Such a construction may conveniently and desirably be made by pressing the lip portions 40 and 41 at the time of press forming the damper plate elements 26 and 27. This makes for strength of construction. As described above, it has been discovered that the strength of the lip portions 40 and 41 is of considerable importance for the durability of the rotary damper assembly of the direct engaging clutch as a whole.

Within the plurality of circumferentially engaging slot shaped apertures 42 of the inner damper plate element 29 there are received a plurality of compression coil spring 30, whose axes extend generally circumferentially to the inner damper plate element 29, and lie generally within its plane, along the slot shaped apertures 38 and 39. The sides of these compression coil springs 30 project out somewhat from the sides of the inner damper plate element 29, and extend into the circumferentially extending slot shaped apertures 38 and 39 of the outer damper plate elements 26 and 27, and are desirably, as in the shown embodiment, seated against the inwardly facing sides of the raised lips 40 and 41 formed along the circumferential peripheries of the circumferentially extending slot shaped apertures 38 and 39, because said raised lips 40 and 41 extend at acute angles of approximately 45° to the planes of these damper plate elements 26 and 27. As has been mentioned above, the damper plate elements 26 and 27 are rotationally, and also axially, coupled together by the plurality of pins 28, which pass through other circumferentially extending slot shaped apertures in the inner damper plate element 29 which are not shown in FIG. 4, and accordingly the outer damper plate elements 26 and 27 are not able axially to be separated by much more than the thickness of the inner damper plate element 29 which is sandwiched between them. Thereby, the compression coil springs 30 are held in place within the sandwich composed of the damper plate elements 26, 29, and 27 in that order.

The rotary damper constructed as described above operates as follows. When the lock up clutch comprising the clutch plate element 18 and the front cover 3 is engaged by the hydraulic fluid pressure on the left side of the clutch plate element 18 being higher than the hydraulic fluid pressure on the right hand side of the clutch plate element 18, as explained above, then it may well occur that a substantial torque jerk is suddenly required to be transmitted between the outer friction plate elements 26 and 27 and the inner friction plate element 29. Suppose that, as shown in FIG. 4, the inner friction plate element 29 requires, according to such a torque jerk, to be rotated in the counterclockwise direction with respect to the outer friction plate elements 26 and 27, as shown by the arrows A and B in the drawing. In such a condition, the ends in the clockwise direction of the compression coil springs 30 will abut against the ends 42a of the circumferentially extending slot shaped apertures 42 in the inner damper plate element 29, and the ends in the anticlockwise direction of the compression coil springs 30 will engage against the end portions 40a of the raised lips 40 which extend along the end portions in the counterclockwise direction of the circumferentially extending slot shaped apertures 38 in the outer damper plate element 26, and also against the symmetrically disposed, but not visible in the drawing, parts of the raised lips 41 which extend along the end portions in the counterclockwise direction of the circumferentially extending slot shaped apertures 39 in the outer damper plate element 27. By the rotational twisting between the inner damper plate element 29 and the outer damper plate elements 26 and 27, in this condition, the compression coil springs 30 are compressed, and absorb the aforesaid rotational torque jerk, thus cushioning torque jerk which is to be transmitted from the power input shaft 1 to the power output shaft 11. Thus, a buffer effect is provided within the lock up connection provided by the lock up clutch between the power input shaft 1 and the power input shaft 11, by this rotary damper mechanism. It will clear, of course, that torque jerk in the other rotational direction between the power input shaft 1 and the power input shaft 11 will also be cushioned by this rotary damper assembly, by the other ends of the compression coil springs impacting against the other ends of the apertures in the outer and inner damper plate elements 26, 27 and 29.

According to this construction, because the outer damper plate elements 26 and 27 are formed with these raised lips 40 and 41, respectively, and because these raised lips extend all around the entire peripheries of the circumferentially extending slot shaped apertures 38 and 39 in these outer damper plate elements 26 and 27, including around the end portions thereof in the circumferential direction, in a continuous fashion, thereby such a construction is much stronger than the above described prior art constructions in which the circumferentially extending slot shaped apertures such as 38 of the damper plate elements of previous rotary dampers were formed only with flaps on their long sides, i.e., along their circumferentially extending sides, but were not formed with any flap or lip portions at their ends in the circumferential direction, i.e., along their short sides. This is because the portions such as 40a of the raised lips 40 and 41, i.e., the parts of the raised lips 40 and 41 which extend in a substantially radial direction to the damper plate elements 26 and 27, serve substantially to brace the outer damper plate elements 26 and 27, and particularly the outer damper plate element 27 which is formed as an annulus of a not very great radial dimension, from bending.

Further, according to the shown embodiment of the present invention, because the raised lips 40 and 41 extend generally at acute angles to the planes of the outer damper plate elements 26 and 27 respectively, of which they form part, and in particular in the present embodiment at angles of approximately 45° thereto, thereby the compression coil springs 30 are snugly held by these angled raised lip portions 40 and 41 properly in place in between the outer damper plate elements 26 and 27, and the central axes of these compression coil springs 42 are well maintained substantially in the central plane of the inner damper plate element 29, even when a considerable centrifugal force is exerted upon these compression coil springs by fast rotation of the rotary damper assembly as a whole. Again, in this construction, the provision of the end portions 40a of the raised lips aids in this snug holding of the compression coil springs 30.

It will be clear to one skilled in the art, based upon the foregoing explanation, that, because the raised lips 40 and 41 are continuous all around the peripheries of the circumferentially extending slot shaped apertures 38 and 39, thereby these peripheries of the slot shaped apertures 38 and 39 are much reinforced, and accordingly a much stronger rotary damper as a whole is attained by the present invention, and this rotary damper is able to stand much greater centrifugal forces, applied for a longer period of use of the rotary damper, than the above outlined prior art constructions. This is particularly important, as explained above, because the rotary damper according to the present invention is located within the aforesaid annular space left between the toroidal torque converter comprising the turbine 13, and the substantially plate shaped clutch plate element 18, and accordingly is of relatively large radius. In such a configuration, strength of the rotary damper with regard to the centrifugal forces which act thereon when it rotates at high speed is a critical design factor.

Although the present invention has been shown and described in terms of a preferred embodiment thereof, and in language more or less specific with regard to structural features thereof, and with reference to the illustrative drawings, it should be understood that in any particular embodiment of the present invention various changes, modifications, and omissions of the form and the detail thereof could be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiment, or of the drawings.

We claim:

1. A rotary power transmission device, comprising:
(a) coaxial power input and power output shafts;
(b) a torque converter, comprising a front cover having an annular outer portion of an angular cross section and rotationally connected to said power input shaft, a pump impeller rotationally connected to said front cover, a turbine rotationally connected to said power output shaft, and a stator; circulation of fluid through said pump impeller, said turbine, and said stator transmitting rotary power from said power input shaft to said power output shaft, said torque converter having an annular space between said annular outer portion of said front cover and said turbine;
(c) a substantially disk shaped clutch assembly coaxial with said torque converter, said clutch assembly comprising said front cover as a first clutch plate element rotationally coupled to said power input shaft, and a second clutch plate element opposing said first clutch plate element;
(d) a rotary damper mounted so as rotationally to couple said second clutch plate element and said power output shaft with a certain amount of damped rotational play therebetween, comprising:
  (d1) two outer mutually opposed damper plate elements and one inner damper plate element sandwiched between said outer damper plate elements, one of said outer damper plate elements being a substantially flat annulus and the other said outer damper plate element being substantially a flat disk; said outer damper plate elements being rotationally coupled together; said inner damper plate element being a flat annulus and formed with a plurality of circumferentially extending slot shaped apertures, and said outer damper plate elements being each formed with a plurality of generally circumferentially extending slot shaped apertures opposing said circumferentially extending slot shaped apertures in said inner damper plate element; and each of said slot shaped apertures in said outer damper plate elements being formed with a raised lip projecting from the general plane of its outer damper plate element in the direction away from said damper plate element, said raised lip being continuous all around the entire periphery of said slot shaped aperture; and
  (d2) a plurality of compression coil springs, each lying within one of said slot shaped apertures in said inner damper plate element and extending generally therealong circumferentially to said inner damper plate element, with its sides projecting into those said slot shaped apertures in said outer damper plate elements which oppose said slot shaped aperture in said inner damper plate element;
  (d3) an assembly of said two annular damper plate elements, a peripheral portion of said damper plate elements and said compression coil springs being positioned in said annular space of said torque converter;
(e) and a means for selectively biasing said first and second clutch plate elements towards and away from one another, so as to be engaged and disengaged from one another;
(f) whereby, when said outer damper plate elements rotate relative to said inner damper plate element, the ends of said compression coil springs in one rotational direction abut against the ends in that rotational direction of said circumferentially extending slot shaped apertures in said inner damper plate element, and the ends in the rotational direction opposed to said one rotational direction of said compression coil springs abut against the ends in said other rotational direction of the said circumferentially extending slot shaped apertures in said outer damper plate elements, said ends in said other rotational direction of said slot shaped apertures in said outer damper plate elements being reinforced by the portions of said raised lips which extend along said ends of said apertures, and the stiffness of the peripheries of said apertures in said outer damper plate elements being promoted by the provision of said raised lips, so that said compression coil springs are well able to withstand high centrifugal forces tending to urge them away from the rotational axis of said rotary damper, when said rotary power transmission device is transmitting power at high rotational speed.

2. A rotary power transmission device according to claim 1, wherein each of said raised lips extends from the plane of the outer damper element of which it forms a part generally at an acute angle and sloping towards the inside of said circumferentially extending slot shaped aperture along whose circumferential periphery it passes; whereby said raised lips may securely and positively maintain said compression coil springs in their proper positions.

3. A rotary power transmission device according to claim 2, wherein said acute angle is approximately 45°.

4. A rotary power transmission device according to any of claims 1, 2 or 3, wherein said raised lips are formed, by pressing, from the material which lies generally inside said circumferentially extending disk shaped apertures, simultaneously with the pressing formation of said outer damper plate elements; whereby the manufacture of said outer damper plate elements may be advantageously facilitated.

* * * * *